United States Patent [19]

Varsa

[11] Patent Number: 4,991,397
[45] Date of Patent: Feb. 12, 1991

[54] HYDRAULIC TURBINE WITH VIRTUAL HEAD DROP AND METHOD FOR ITS MANUFACTURE

[76] Inventor: Istvan S. Varsa, 4000 Massachusetts Ave., NW. #1631, Washington, D.C. 20016

[21] Appl. No.: 447,916

[22] Filed: Dec. 8, 1989

Related U.S. Application Data

[63] Continuation-in-part of Ser. No. 217,651, Jul. 12, 1988, abandoned.

[51] Int. Cl.$^5$ .............................................. F16D 31/02
[52] U.S. Cl. ....................................................... 60/398
[58] Field of Search ............. 415/DIG. 2; 74/DIG. 9; 60/398

[56] References Cited

U.S. PATENT DOCUMENTS 3,163,118 12/1964 Baumann ................................. 60/398
3,796,051 3/1974 Kuwabara ............................. 60/398
4,660,379 4/1987 Lane ....................................... 60/398

Primary Examiner—Edward K. Look
Attorney, Agent, or Firm—Eric P. Schellin

[57] ABSTRACT

A hydraulic turbine system with virtual head drop consisting of a water jet member having a generally horizontally disposed driving nozzle with inlet and outlet, the driving nozzle being fluid coupled to a generally horizontally disposed elongated inlet means and being fluid coupled to a suction nozzle having an outlet proximate the driving nozzle outlet and coupled to a conically configured inlet, the water jet member thereby adapted for producing a fluid jet at a defined hydrostatic head, a runner turbine member defining a watertight system within which are gate operating mechanisms being fluid coupled to a runner effecting an empty vessel of atmospheric pressure, the static pressure therefor induces movement of fluid into a steady flow of fluid through the runner, and the runner turbine member having a tube thereof exiting fluid to the conically configured inlet for symbiotic cooperation with the water jet member.

17 Claims, 5 Drawing Sheets

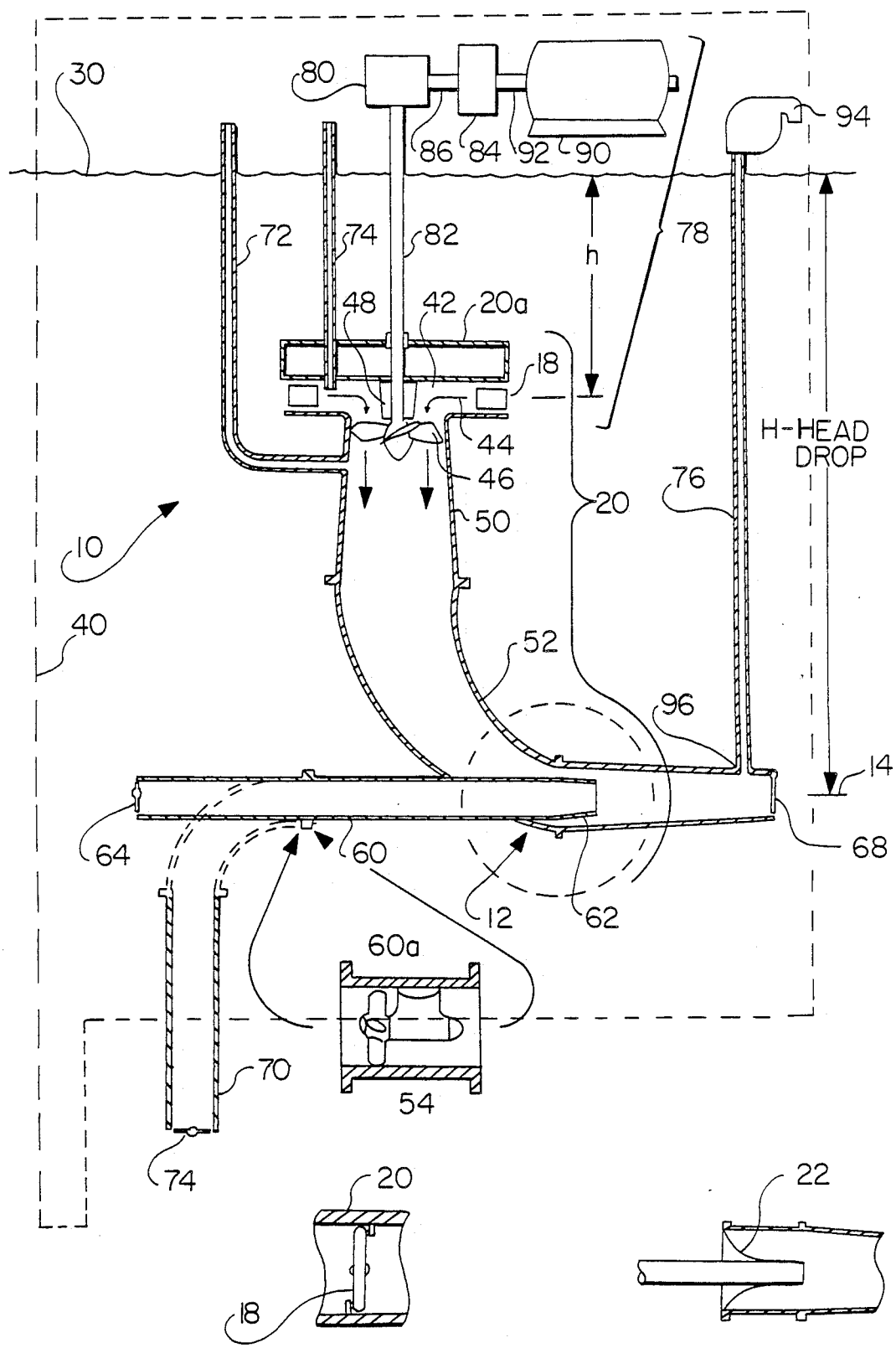

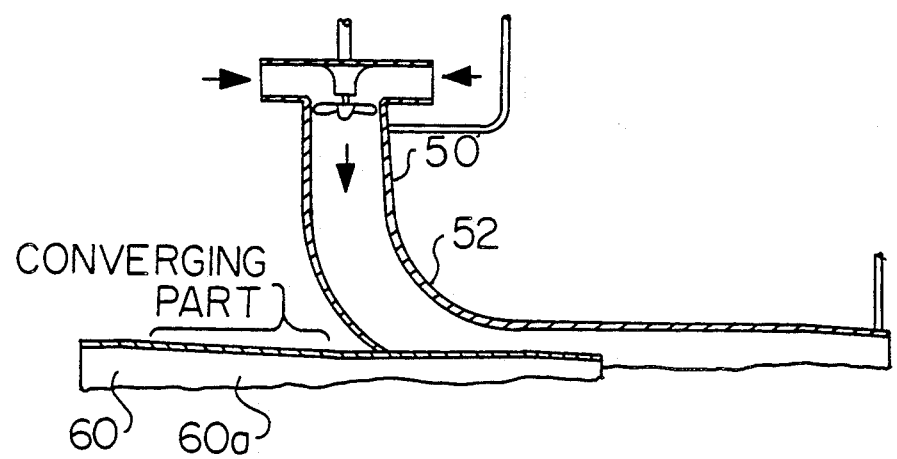
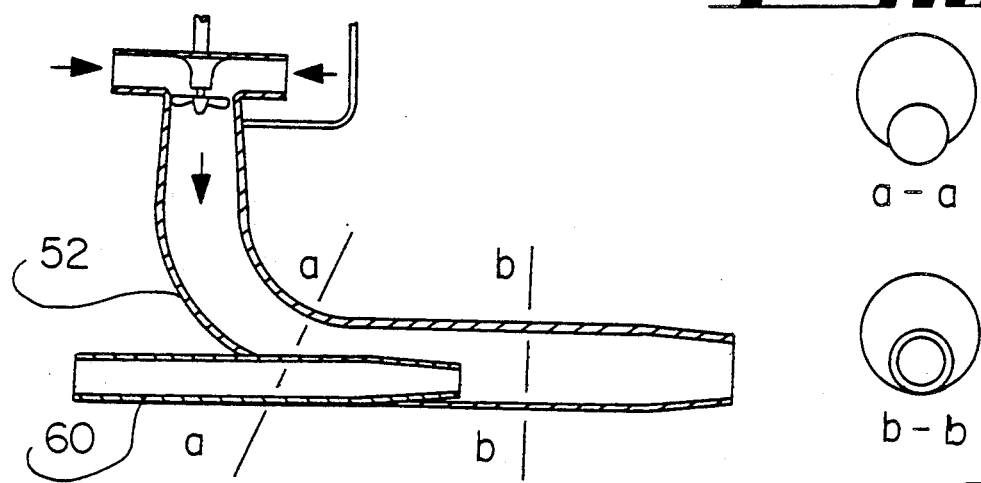

HYDRAULIC TURBINE WITH VIRTUAL HEAD DROP AND METHOD FOR ITS MANUFACTURE

The invention of this application is an improvement and continuation in part of the invention of my co-pending application Ser. No. 217,651, filed Jul. 12, 1988, but now abandoned, for Hydraulic Turbine With Virtual Head Drop and Method for its Manufacture, and the entire contents thereof is incorporated herein by reference.

BACKGROUND OF THE INVENTION

1. Field of the Invention

The invention relates to an improved hydraulic turbine with virtual head drop, and in which the watertight vessel with atmospheric pressure induces the static pressure to move the water into a steady flow through the runner of the turbine, and the invention is also directed to the method for its construction and operation thereby; more particularly the invention is directed to system in which pressure of a driving nozzle of water jet, entrains water leaving the runner through the suction nozzle of the jet, thus ensuring a continuous removal of water from the system; as the steady ejection of the water is in motion, it is uninterruptedly turning the shaft of the turbine and the water flow is converting the turning if it into useful work, as more particularly described herein.

The present invention is directed to a hydraulic turbine system with virtual head drop consisting essentially of a water jet member having a generally horizontally disposed nozzle with inlet and outlet, the driving nozzle being fluid coupled to a generally horizontally disposed elongated inlet means and being fluid coupled to a suction nozzle having an outlet proximate the driving nozzle outlet and coupled to a conically configured inlet, the water jet member thereby adapted for producing a fluid jet at a defined hydrostatic head, a runner turbine member defining a watertight system within which are gate operating mechanisms being fluid coupled to a runner effecting an empty vessel of atmospheric pressure, the static pressure therefor induces movement of fluid into a steady flow of fluid through the runner, and the runner turbine member having a tube thereof exiting fluid to the conically configured inlet for symbiotic cooperation with the water jet member.

2. Description of the Prior Art

Various prior art hydraulic turbines that utilize kinetic energy of natural or artificial waterfalls which are channelled to the turbine and are operated by this moving flow, and the like, as well as apparatus and method of their construction in general, are found to be known, and exemplary of the U.S. prior art are the following:

3,163,118 Baumann
3,796,051 Kuwabara
4,619,593 Molnar
4,660,379 Lane

The patent to Molnar discloses exclusively a fluid extracting apparatus and any energy conversion device or underwater turbine is not a concern at all; the Molnar novelty is apparently directed specifically to reciprocating fluid extractor and displacement cage. Known types of hydraulic turbines of interest are those of Francis, Kaplan, a propeller type, Bulb and the Banki or other impulse types of turbines. Further, Molnar water extraction device necessarily requires a back-and-forth reciprocating motion to intermittently move out doses of water whereas the water type extracting operation of the present invention is continuous throughout. Baumann, Kuwabara and Lane show prior art kinds of hydraulic turbines. These patents or known prior uses teach and disclose various types of hydraulic turbine devices of sorts and of various manufactures and the like as well as methods of their construction, but none of them whether taken singly or in combination, disclose the specific details of the combination of the invention in such a way as to bear upon the claims of the present invention.

SUMMARY OF THE INVENTION

An object, advantage and feature of the invention is to provide a novel device in the configuration of a hydraulic turbine system is constructed and self contained in a production platform, and that may be associated with sea tower rigs constructed and manufactured by the Marine Construction Group of the Bethlehem Steel Corporation, in submerged waters positioned proximate to available conditions of pressures and static conditions in great depths of water. Land and landrights, structures, improvements, reservoirs, dams, waterways, roads, railways, bridges, and like constructions and locations requirements by zoning impede the construction of any embodiment of the present invention, and construction costs are reduced thereby by about 35–60%; shorter investment return periods are possible and lower energy production cost per KWH are realized.

Another object of the invention is directed further to a device providing for the construction of a hydraulic turbine system that essentially provides no environment damage or impact, no harm to aquatic life or vegetation; no impact on agriculture, aquaculture, fisheries, health, employment conditions, population centers or removals thereof, and uses a generally inexhaustible, recurring and useable energy source at low costs.

Also an object of the invention is to provide a simple and direct method for the improved construction of a hydraulic turbine system that is capable of use on rivers, lakes, seas mounted on off-shore production platforms of one sort or another, and which may include smaller units on twin-ship hull constructed and supported platforms, or individually on small ships.

These together with other objects and advantages which will become subsequently apparent reside in the details of the process and operation thereof as more fully hereinafter is described and claimed, reference being had to the accompanying drawings forming a part hereof, wherein like numerals refer to like parts throughout.

DESCRIPTION OF THE SEVERAL VIEWS OF THE DRAWINGS

FIG. 1 is a schematic and diagrammatic sketch of a hydraulic turbine and illustrating a typical installation of the turbine according to a preferred embodiment and best mode of the present invention.

FIG. 2 is a sectional view of wicket valves or gates taken along lines 2—2 of FIG. 1 and embodying the concepts of the invention.

FIG. 3 is sectional representation of a back flow preventor that is usable in nozzle and taken along lines 3—3 of FIG. 1.

FIGS. 8 and 9 show other improved arrangements of a driving tube 60 and elbow termination and nozzle 52 in accord with features of the invention; FIGS. 9A and 9B are sections taken along line A—A and B—B respectively thereof.

DESCRIPTION OF A PREFERRED EMBODIMENT OF THE INVENTION

Figures 4A, 4B:
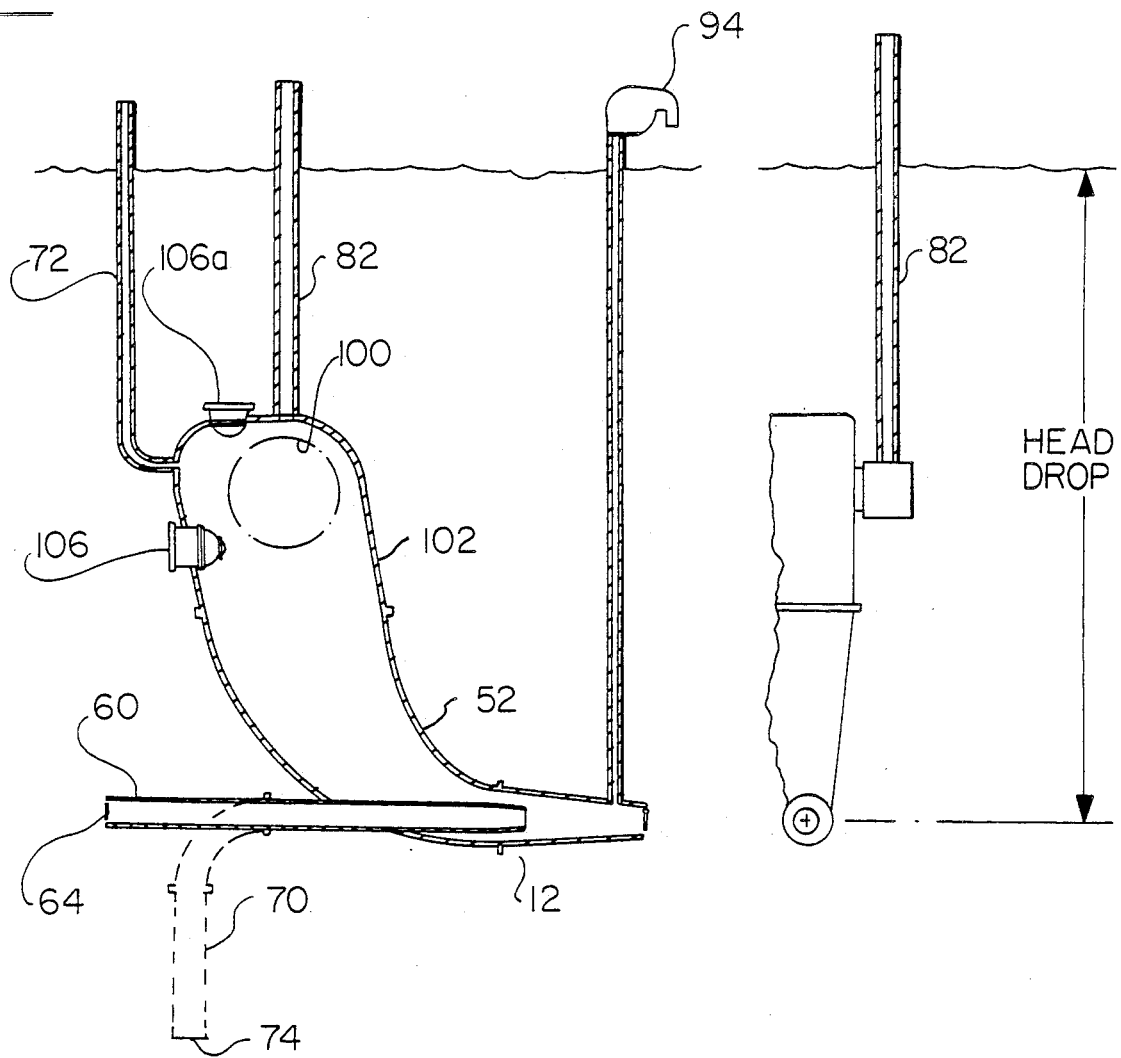
FIGS. 4A and 4B are elevation and side views, respectively, of an embodiment of the invention with a Pelton wheel and embodying concepts of the invention.

Referring now to the drawings there is shown in FIG. 1 a hydraulic turbine system 10 including a water jet 12 shown displaced under water to have and with a virtual head drop 14 so a vertical parameter of static pressure is disposed upon the turbine system 10 and water jet 12. The hydraulic turbine system may be any of the known kinds of turbines, such as Francis, Kaplan, propellor, bulb and the Banki, or other kind of impulse type of turbine that is capable of using kinetic energy of natural or artificial waterfall that is channelled into or through the turbine and is operated by a flow of moving water as is to be described below.

The hydraulic turbine system 10 FIG. 1 utilizes static pressure or head 14 of the water and the hydraulic system operates entirely and completely under water.

The hydraulic turbine system 10 of FIG. 1 may be a simplified version of the known ones by omitting the spiral case stay ring, penstock and draft tube (not shown), but which possesses a watertight container system 20 extending from a water tight container 20a to and including the water jet 12, as shown, and performs a kind of symbiotic cooperation with the water jet 12.

FIG. 2 shows a section of the wicket gate operating mechanism so a fluid tight seal is evident, and FIG. 3 shows a backflow preventor valve 22 that may be used in water jet 12, as desired.

The hydraulic turbine system 10 is positioned beneath the water surface 30 in a manner not shown nor relevent to the present invention, but may be attached or made in fixed securement to off shore production platform structures, underwater encased multiple person living structures, and simply made into a production platform 40 and set on a bottom support platform or structure (not shown) significantly beneath the water surface 30.

Water that may enter the gate mechanism 18 traverse a passway 42 shown by arrow 44 to pass downwardly through a turbine propellor or a runner 46, which turbine structure 48 is shown mounted on an underside of the watertight container 20a, all of which are encased in a draft tube 50 configured as a large cylindrical element with elbow and conically shaped termination 52 leading from the outside and coupling into the water jet 12; this thus shown forming the water tight container system 20. For any necessity that may be considered, the dimension of the draft tube 50 and its termination 52 may be decreased, a converging portion of a driving nozzle 62 of the water jet 12 could be located or placed lower and generally tangentially with a wall of the termination 52; or at any intermediate location therebetween. Improved flow, less turbulence and better velocity characteristics is achieved by placing the driving tube 60 generally tangentially into the lower portion beneath the axis of the termination 52 so as to provide higher velocity and impact characteristics of flow in the jet 12.

In order to compensate for losses, including frictional and configurational losses and the like, a booster pump 54 installed in a short tubular member 60a, may be coupled in a longitudinally disposed tube 60, which also induces flow or water to pass through the tube 60 as described below. The booster pump 54 thus serves to provide, by its constant operation and action, an energy input into the system, and to compensate for losses, frictional characteristics and configurational characteristics of the hydraulic turbine system, accordingly.

Water may, if necessary, be induced through the longitudinally disposed tube 60 due to constant operation and action of the booster pump 54 in the tube 60 to provide an energy input into the system, and to the differential static water pressures between the water surface 30 and the pressure of the head 14 at the tube 60, to pass through the driving nozzle 62 disposed generally peripherially and concentrically about and within the water jet 12.

The tube 60 may be entirely longitudinally disposed horizontally as shown, and/or may have a vertical component of tube 70 that augments the head 14 by applying a higher value of head from a lower depth as shown. Both the tubes 60, 70 have an entrance butterfly control valve 64, 74 and and exit valve 68 which may be a pressure or flow actuated, undirectionally swing disposed check valve as shown, for preventing retroentrance or reentry of outside water from entry into the water jet 12.

Hydraulically coupled two or more turbine systems 10 may be arranged in series in such a way that the discharge water through the exit valve 68 enters the second driving tube 60 of the second turbine system 10 in an aligned array along a common axis to increase the inflow, the intake of the driving tube 60 may be conveniently generally cone-shaped or funnel-shaped. The axis thereof may be straight, circular or any self-recurring configuration with water jets feeding toward and into each other.

In consequence of the construction of the completely watertight character of the hydraulic turbine system 10 and its connection by conduits or passways 72, 74 to outside air pressure at the water surface 30 provides for the draft suction tube 50 and the water jet 12 to represent an empty vessel of atmospheric pressures, and inducing the static pressure to effect a movement of water into a steady flow through the runner 46 of the turbine system 10. The pressures of the driving nozzle 62 is drawn from deeper located, larger static water pressures, by opening of the butterfly control valve 64 that forces or draws the water into the tube 60.

The impact of dynamic pressures imposed upon an in-rushing water mass that is continuously fed by a constant static pressure of the head of water 14 converted into flow dynamics in the tube 60, together with up to about 95% regained kinetic energy of the discharge water of the turbine, overcomes the static pressure exerted on the outside area of the swing check valve 68 which therefore remains open.

Thus the uninterrupted removal of water at the same rate as it enters the system is realized and the energy transformation into useful shaft work is accomplished.

To achieve a near simultaneous impact of the joint kinetic energy on the swing check valve 68, the wicket gates 18, and the butterfly valve 64 must be controlled by a time delay relay (of conventional construction and energization but not shown). The determination of the time lag is to be established by model testing or experimentation and design. Once a continuous ejection of the water is in motion, the previously artificial head drop is replaced by a virtual head drop 14.

In order to facilitate proper timing of the opening of valves 18, 64, the start-up operation of the turbine-generator set 78, including turbine 46, gear drive 80 coupled on shaft 82, an electromagnetic or other general type of clutch 84 coupled on shaft 84, and generator 90 coupled on shaft 92, must be changed by mechanical engineering modifications of limitations and specifications. With closure of wicket gates 18 the runner or turbine 46 the shaft 82 and the gear drive 80 has to be accelarated up to its operating speed; the armature of the generator of the generator 90 has to be accelerated up to its operating speed as well; and the rapid opening of the wicket gates 18 and simultaneously a gradual engagement of the clutch 84 remotely controlled or automatically controlled sets and continues the hydraulic turbine system 10 in operation. Accomplishing the above described initial acceleration of the unloaded system 10, an auxiliary device or engine or motor driven mechanism (of conventional construction but not shown) could be applied by engaging -disengaging it to the runner or turbine 46, shaft 82, gear drive 80, and generator 90; these may be disposed on a common structure or platform of a power generating station in production platform 40. This auxiliary device referred to above has to be used at the first start-up only; all other start-ups could use the generated power of the running units.

Figure 6:
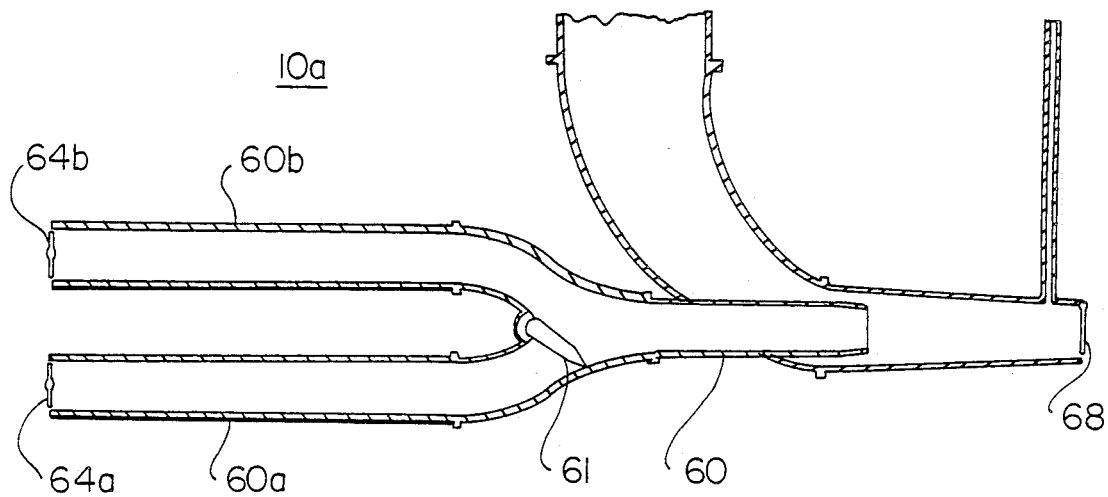
FIGS. 6 and 7 show elevation views of modified drive tubes and valves contained in the tubes according to a further embodiment of the invention.

In order to facilitate a less exacting synchronization and to elongate the time of keeping the swing check valve 68 open, branches 60a and 60b of the tube 60 having a butterfly valve 64a could be provided in the installation as is shown in the system 10a of FIG. 6. This branch tube 60a is connected with a conveying diverter 61 which is deflected by a remote controlled time delay relay (not shown). By opening the butterfly valve 64a a second impact could be generated and thus the time interval of opening the swing check valve could be elongated for a possible delayed arrival of the impact from the turbine discharge water. Proper timing for activating the butterfly valves 64a, 64b and the conveying diverter 60c are specified as may be determined by desired results, testing, other parameters and the given depth of the system 10a.

Figure 7:
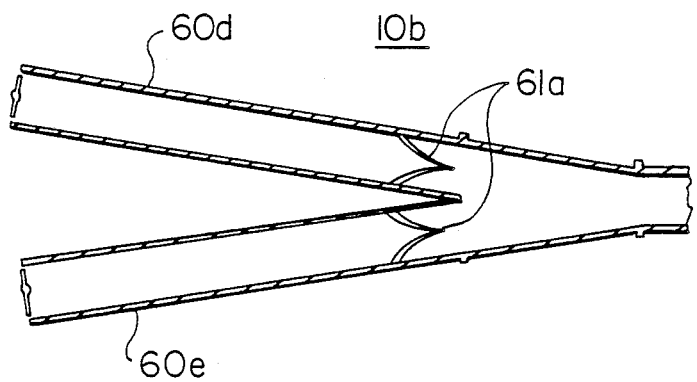

A simplified hydraulic turbine system 10b is comprised in a construction and embodiment including a impact-extension device of FIG. 6 is shown in FIG. 7; instead of a remotely controlled diverter, a backflow preventer valves 61a constructed of elastomeric material serves in both branches of driving tubes 60d, 60e. These elastomeric valves 61a readily open under pressure, and they prevent any backflow of water in the system 10b into other branches of the tubes 60d, 60e, the filling of which would take valuable time and impact energy, thus the impact of the inrushing water could reach the exit valve or swing check valve without delay and in full force.

If the operation of the turbine system 10 must for any cause be suspended in operation, then before restarting the system 10, trapped residual water must be drained off with use of a pump 94 through a previously opened valve 96. Where the results may require modification of the operation of the system 10, the backflow preventer valve 22 shown in FIG. 3 is installed in the construction of the system 10. To protect the hydraulic turbine 10 from clogging by debris, aquatic animals and the like that may be sucked in the system 10, water entry areas could be surrounded with appropriate nets that could be installed around the periphery of the platform supporting the production platform 40 for carrying the power generator 90. A common or same principle is applicable to the impulse turbines 46.

FIGS. 4A and 4B is directed to placing a Pelton wheel 100 in a watertight container 102 in which regular driving needle valve 106, 106a, and the water jet 12 in the nozzle and the termination 52 are located below bucket wheels of the Pelton wheel 100, so the virtual head drop 14 could be continuously maintained. By opening the valves and applying the start-up procedures described with the reaction turbine of FIG. 1, the operation of the Pelton wheel is assured.

With particular reference to FIGS. 8 and 9 of the drawings, there is shown other improved arrangements of a driving tube 60 and elbow termination and nozzle 52 in accord with features of the invention. FIG. 8 shows the driving tube 60 having a tapered and converging portion 60a as the driving tube enters the nozzle 52 at its lower and eccentric of the axis of the nozzle 52; a section taken along line A—A of FIG. 9 is shown as FIG. 9A; and a section taken along line B—B of FIG. 9 is shown as FIG. 9B.

Figures 4A, 4B, 5A, 5B:
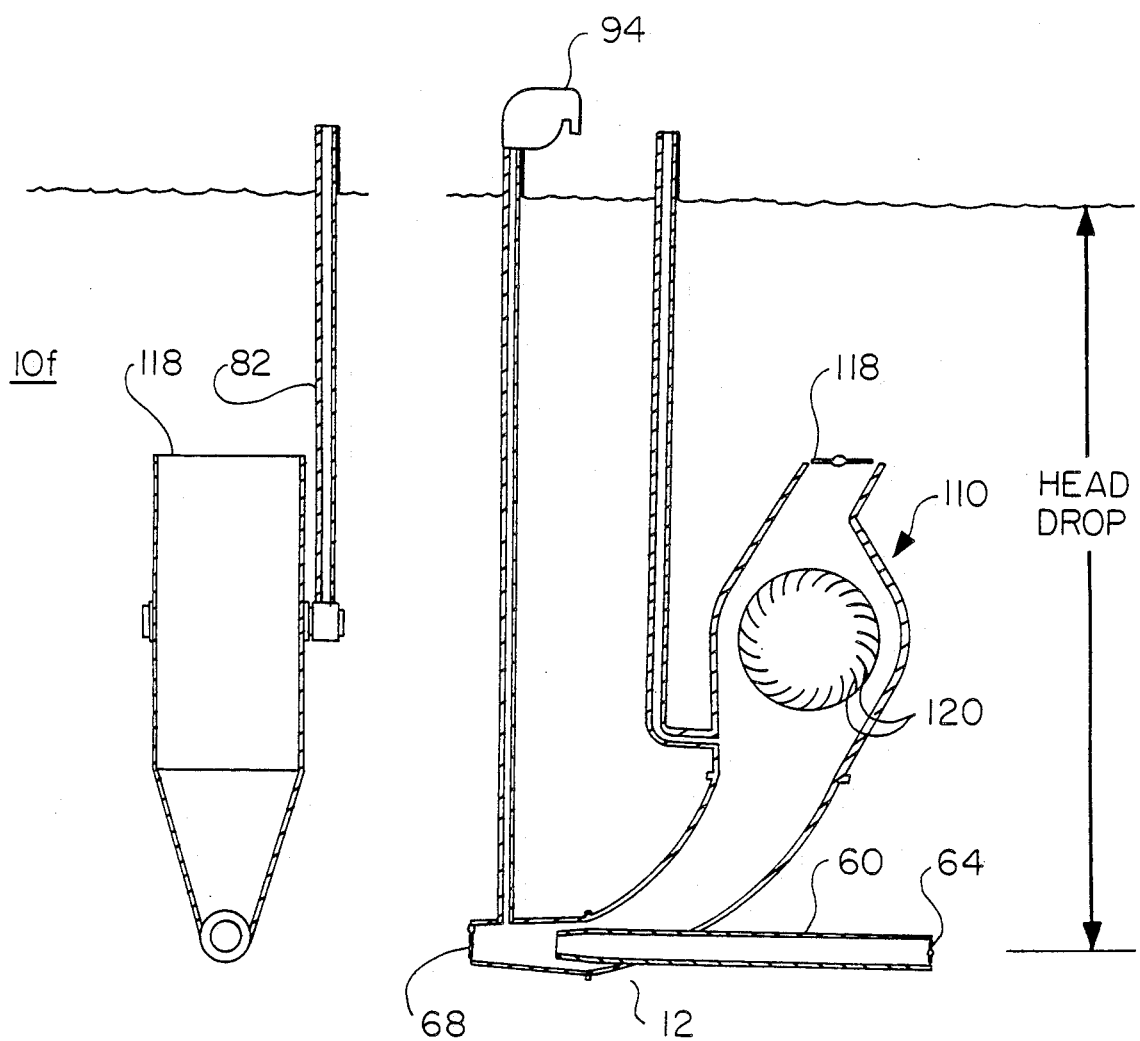
FIGS. 5A and 5B are side and elevation views, respectively, of an embodiment of the invention using a high efficiency Banki turbine and embodying concepts of the invention.

Similarly, a high efficiency Banki turbine 110 shown in FIGS. 5A and 5B may be placed in the container or production platform 40 with an appropriate watertight inlet valve 118 and the water jet 112 located below shovel cylinder member(s) 120, and the operation of the turbine system 10f is assured.

The production platform 40 may constitute a reinforce concrete water basin for providing the hydraulic turbine system with securement at any geographically unlimited selection of site locations.

Generally, in the present invention it is provided that the efficient configuration of the entrance opening and wicket gate(s) 18, 118 of the turbine system 10 as well as the entrance opening 64 and exit nozzles 68 of the water jet 12, 112 are subjected to modifications known within the confines of the prior art.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed and desired to be secured by Letters Patent is:

1. A hydraulic turbine system with virtual head drop for converting energy of static pressure into rotary energy comprising
   a conically configured inlet,
   a water jet member having a generally horizontally disposed driving nozzle with inlet means and outlet means,
   the driving nozzle being fluid coupled to a generally horizontally disposed elongated inlet means and including constant operation of a booster pump in the inlet means to provide an energy input into the system, the inlet means being fluid coupled to a suction nozzle having an outlet proximate the driving nozzle outlet and coupled to the conically configured inlet, the water jet member thereby adapter for producing a fluid jet at a defined hydrostatic head, a runner turbine member defining a watertight system within which are gate operating mechanisms being fluid coupled to a runner means effecting an empty vessel of atmospheric pressure, the static pressure therefor inducing movement of fluid into a steady flow of fluid through the runner means, and the runner turbine member having a tube thereof exiting fluid to the conically configured inlet for symbiotic cooperation with the water jet member.

2. The apparatus of claim 1 wherein the gate operating mechanisms are water tight sealable wicket inlet fluid gates.

3. The apparatus of claim 1 wherein the runner turbine member is an impulse turbine.

4. The apparatus of claim 1 wherein the runner turbine member is a reaction turbine.

5. The apparatus of claim 1 wherein the driving tube has a branched inlet.

6. The apparatus of claim 1 wherein the driving tube has branched inlet tubes and a valve means is located proximate a coupling of the branched inlet tubes.

7. The apparatus of claim 1 wherein the hydraulic turbine system is constructed in a production platform means.

8. The apparatus of claim 1 wherein the hydraulic turbine system is constructed in a production platform means for use in any of a plurality of hydraulic turbine systems.

9. The apparatus of claim 1 wherein the hydraulic turbine system is constructed in a self-contained production platform means, and measurement means provide control and regulation of the hydraulic turbine system.

10. The apparatus of claim 1 wherein the hydraulic turbine system includes a production platform means and is constructed and arranged within the production platform means for submergence at high static pressures.

11. The apparatus of claim 1 wherein the hydraulic turbine system is in symbiotic cooperation with water jet means.

12. The apparatus of claim 1 wherein the hydraulic turbine system includes an artificial head drop converted into a virtual head drop.

13. The apparatus of claim 1 wherein the water jet member is operated by constant static pressure-fed kinetic energy.

14. The apparatus of claim 1 wherein the hydraulic turbine system includes means that provide for impact energy of the water jet member and kinetic energy of discharge water of the hydraulic turbine to act simultaneously.

15. The apparatus of claim 14 wherein the hydraulic turbine system is operated with simultaneity control of a time delay relay for keeping an exit valve open.

16. The apparatus of claim 7 wherein the production platform means is a reinforced concrete water basin for providing the hydraulic turbine system with securment of geographically selected site locations.

17. Method of making energy available from hydraulic turbine systems submerged at static pressures for coventing energy of static pressure into rotary energy comprising the steps of applying static pressures into a hydraulic turbine system, creating a volume of air in a chamber in the turbine system and effecting in a tube hydraulic drop of water through a head thereof, dropping a volume of water through the head using changes in dynamic pressure including constant operation of a booster pump in the tube to provide an energy input into the system, and developing an output of energy.

* * * * *